United States Patent
Huang

(10) Patent No.: US 6,419,083 B1
(45) Date of Patent: Jul. 16, 2002

(54) ACCORDION LASER DISC PROTECTIVE FOLDER

(76) Inventor: Yu-Man Huang, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/735,474

(22) Filed: Dec. 14, 2000

(51) Int. Cl.⁷ .............................................. B65D 85/57
(52) U.S. Cl. .................. 206/308.1; 206/425; 229/67.3
(58) Field of Search .................. 40/372; 206/308.1, 206/308.3, 311, 425, 445, 312; 229/67.2, 67.3, 72

(56) References Cited

U.S. PATENT DOCUMENTS

| | | | | |
|---|---|---|---|---|
| 329,676 A | * | 11/1885 | Reade | 206/425 |
| 2,151,469 A | * | 3/1939 | Hochtheil | 229/72 |
| 2,261,806 A | * | 11/1941 | Hills | 206/311 |
| 2,323,245 A | * | 6/1943 | Schenker | 206/311 |
| 4,015,350 A | * | 4/1977 | Zurwelle | 40/372 |
| 4,730,727 A | * | 3/1988 | Petroff | 206/425 |
| 4,762,225 A | * | 8/1988 | Henkel | 206/308.1 |
| 5,025,979 A | * | 6/1991 | Dellacroce | 229/67.3 |
| 5,064,069 A | * | 11/1991 | Su | 206/425 |
| 5,271,502 A | * | 12/1993 | Chang | 206/425 |
| 5,785,399 A | * | 7/1998 | Frankeny et al. | 206/308.1 |

* cited by examiner

Primary Examiner—Jim Foster
(74) Attorney, Agent, or Firm—Troxell Law Office PLLC

(57) ABSTRACT

The invention herein relates to an accordion laser disc protective folder structure, more specifically a protective folder with two lateral expanding, continuous according folding sheets, replacing the conventional loose-leaf folder or the fixed laser disc protective folder; there are accordion folding sheets on the two sides of the protective folder and several protective pockets mounted according to the interval distances of the folds for storing the laser disc; the design of the accordion folds make each of the protective pockets display discs with a proper interval distance to allow the user, when trying to remove a laser disc, only to open the cover of the protective folder to fast glance over the whole contents of all the stored laser discs and easily search for the required laser disc, therefore solving the disadvantage of the conventional laser disc protective folder which required the user to turn each page one by one.

3 Claims, 7 Drawing Sheets ated with the structure and usage of the invention herein should not be departing from the spirit of scope of the invention herein as defined in the appended claims.

ACCORDION LASER DISC PROTECTIVE FOLDER

BACKGROUND OF THE INVENTION

1) Field of the Invention

The invention herein relates to an accordion laser disc protective folder structure, more specifically a protective folder with two lateral expanding structure of continuous accordion folds for storing laser discs to display a proper interval distance convenient for the user to quickly glance over the contents of the laser disc.

2) Description of the Prior Art

The innovation of the laser disc container has been a blessing to those interested in collecting a huge quantity of laser discs. Therefore, various kinds of inventions of laser disc protective folders, such as the invention herein, have become available on the market.

The present conventional laser disc protective folders are generally in the forms of loose-leaf and fixed envelope, as shown in FIGS. 1-1, 2-1 and 2-2. The conventional laser disc protective folders usually have a notebook body with a plurality of internal protective pockets formed by opposing two pieces into a pocket shape; for the secured protective pockets, there are fixed and loose-leaf styles. The fixed style has either the sealed sides of the protective pockets bounded into an album with one or two disc pockets on each page or the loose-leaf with several holes in proper interval distance for the rings on the folder to go through, also with one or two pockets on each page. However, for the fixed structure of both the forgoing conventional protective sheets, the user has to turn the pages in order to get access to the laser disc. That is very inconvenient.

SUMMARY OF THE INVENTION

In order to improve the problems associated with the prior art laser disc containers, the inventor herein has redesigned the fixed mechanism of the conventional protective folders for the benefit of easy access and integral storage. Therefore, the inventor of the invention herein, based on the experience accumulated from the engagement in years in professional research, manufacture and improvement, through continuous experimental production and trial, has developed the accordion laser disc protective folder, wherein there are accordion folding sheets on the two sides of the protective folder and several protective pockets are mounted according to the interval distances of the folds for storing the laser disc; the design of the accordion folds allows each of the protective pockets to display with a proper interval distance to further allow the user to quickly glance over all the stored laser discs by merely opening the cover of the protective folder.

The primary objective of the invention herein is to solve the problem of the conventional folders that do not allow the user to glance over the whole contents of the laser discs but require the user to turn pages and waste time searching and accessing discs.

In order to achieve the forgoing objective, the accordion laser disc protective folder of the invention herein comprises accordion folding sheets on the two sides of the protective folder and several protective pockets mounted according to the interval distances of the folds for storing the laser disc; through utilizing the design of the accordion folds, each of the protective pocket can be displayed with a proper interval distance convenient for the user to only open the cover of the protective folder to fast glance over the whole contents of all the stored laser discs.

To enable a further understanding of the said objective, the technological methods and the efficiency of the invention herein, the brief description of the drawings below is followed by the detail description of the preferred embodiment. Therefore, whatever features may be similar to the structure and usage of the invention herein should not be departing from the spirit of scope of the invention herein as defined in the appended claims.

BRIEF DESCRIPTION OF THE DRAWING

FIG. 1-2 is an isometric pictorial drawing of a conventional laser disc folder in the fixed style with two pockets.

FIG. 2-1 is a pictorial isometric drawing of a conventional laser disc folder in the loose-leaf style.

FIG. 2-2 is a pictorial isometric drawing of a conventional laser disc folder in the loose-leaf style with two pockets.

FIG. 3-1 is a pictorial isometric drawing of the assembled invention herein.

FIG. 3-2 is a pictorial isometric drawing of the disassembled invention herein.

DETAILED DESCRIPTION OF THE PREFERRED EMBODIMENT

Figure 1:
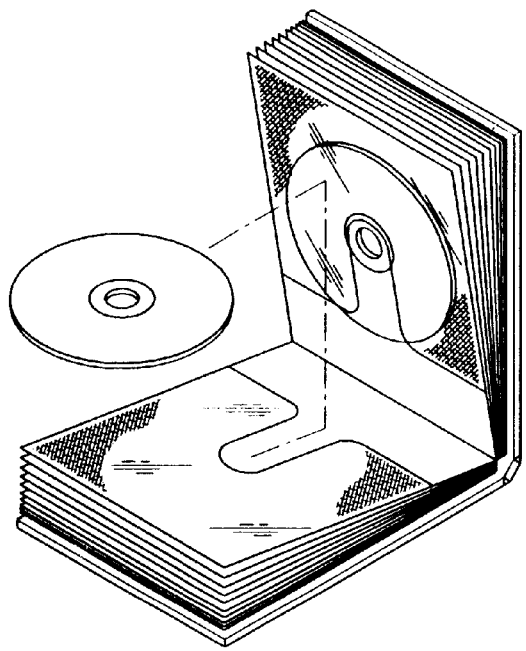
FIG. 1-1 is a pictorial isometric drawing of a conventional laser disc folder in the fixed style.
Figures 1, 2:
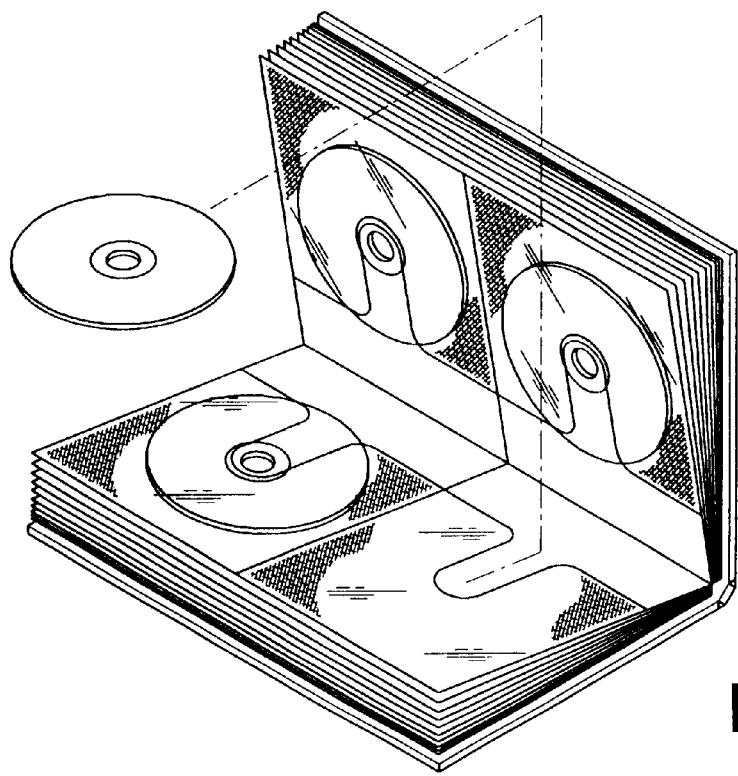
Figures 1, 2:
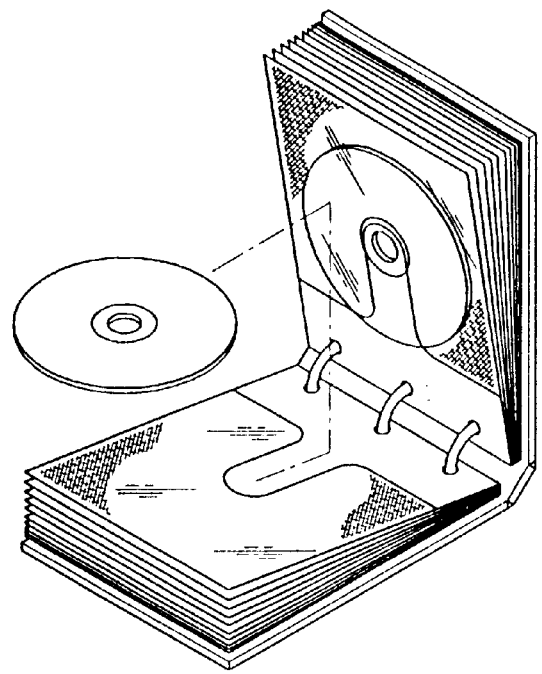
Figure 2:
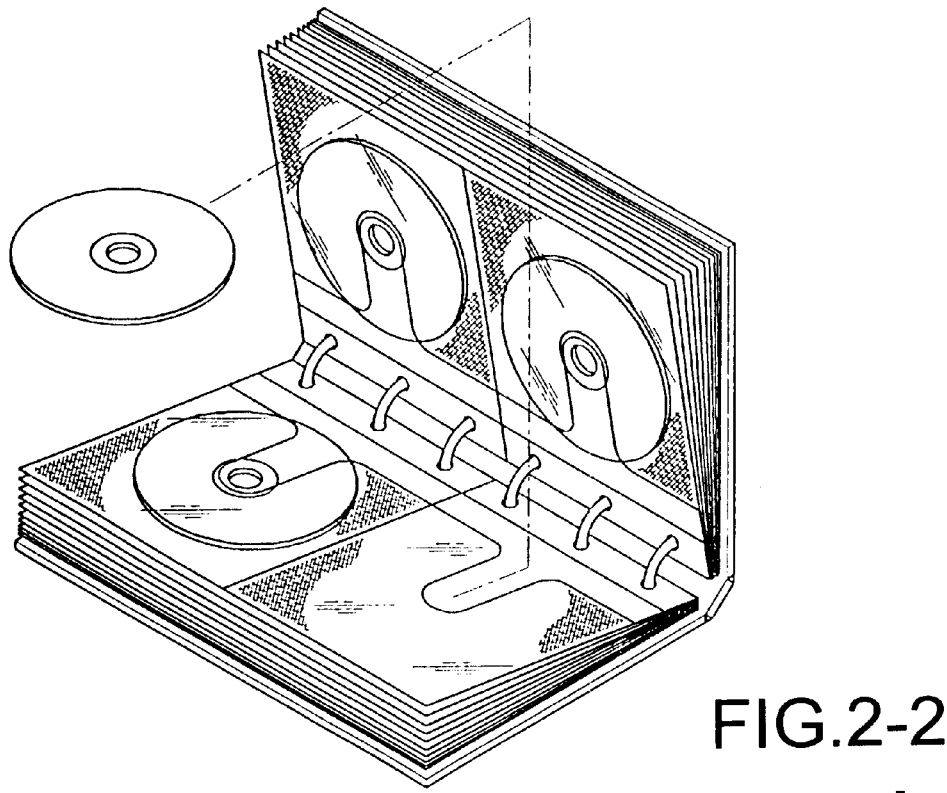
Figures 1, 3:
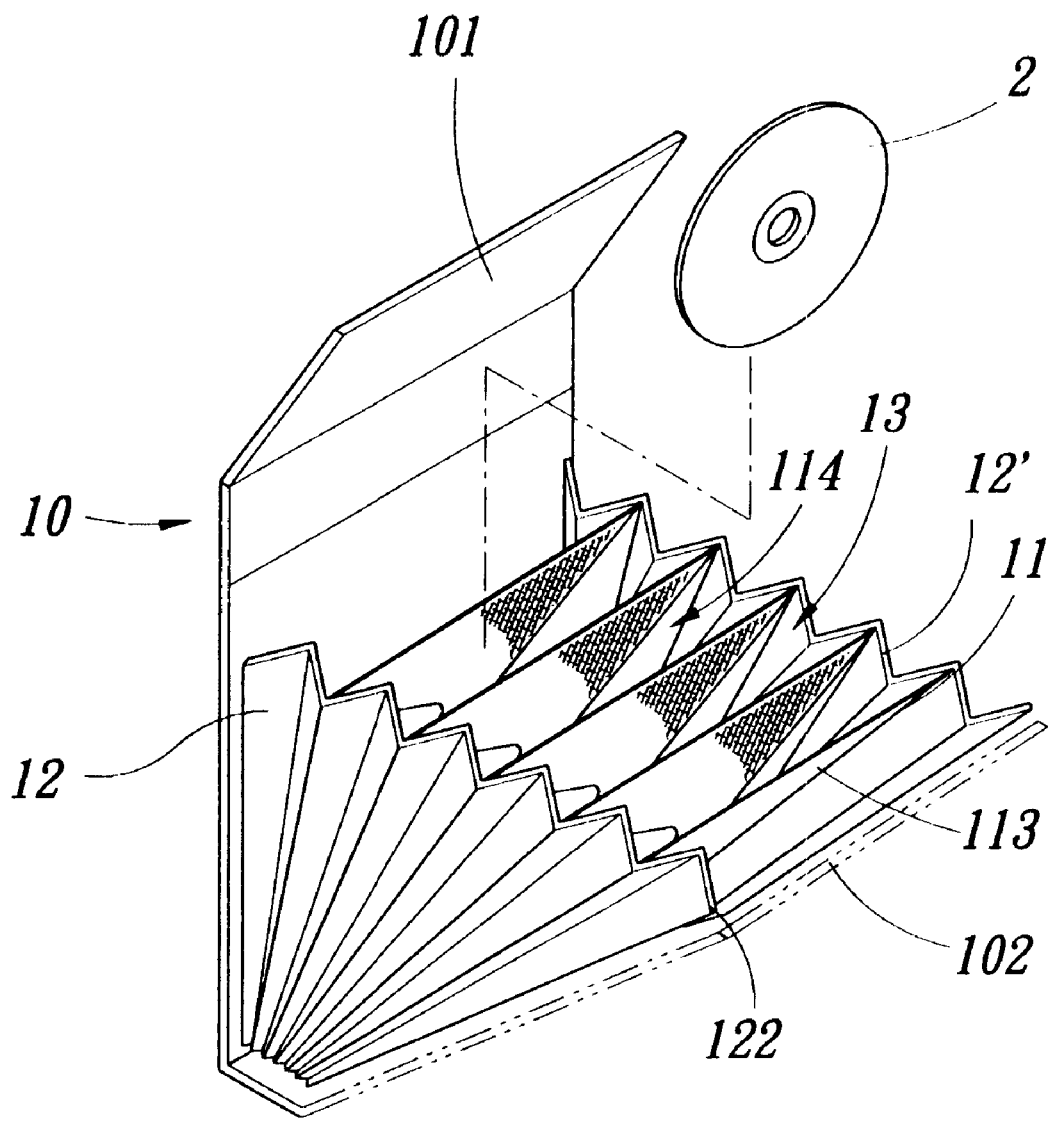
Figures 2, 3:
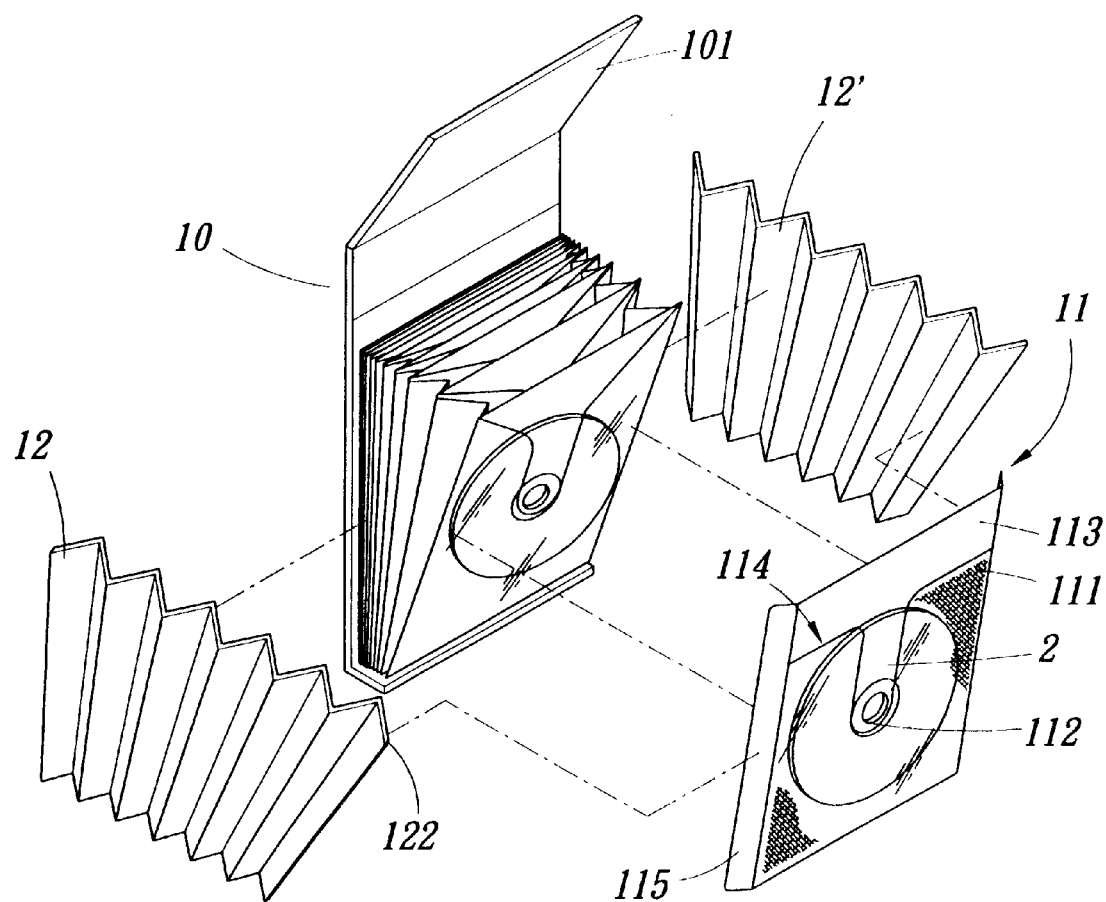

Referring to FIGS. 3-1 and 3-2, the isometric drawings of the assembled and disassembled invention herein. The invention herein comprises an external shell (10), a plurality of protective pockets (11) and two corresponding sides of accordion folding sheets (12, 12'), wherein the partitions (113) of the protective pockets (11) are made of flannel fabric as the main body, with pocket body (111) on the respective sides to form the pocket container (114) to store the laser disc; furthermore, an opening at the center of the said pocket body (111) is designed for the easy access to the laser disc (2) with fixing ears (115) on both sides of the protective pocket (11) for securing to the internal folding surface (121) of the accordion folding sheet (12); the accordion folding sheet (12) is a folding structure in a fan-shape, wherein the front fixing end (122) secured to the front plane (102) of the shell body (10) with the other end (123) secured to the shell body (10), wherein the front plane (102) can be covered by the cover plane (101) for covering; furthermore, proper interval slots (13) between protective pockets (11) are formed by parting every protective pocket (11) according to the folding partition of the accordion folding sheets (12); the laser disc (2) stored in the protective pocket (11) can be displayed through the interval slot (13) to enable the user to glance all the laser discs (2) in order to access to the one predetermined.

Figure 4:
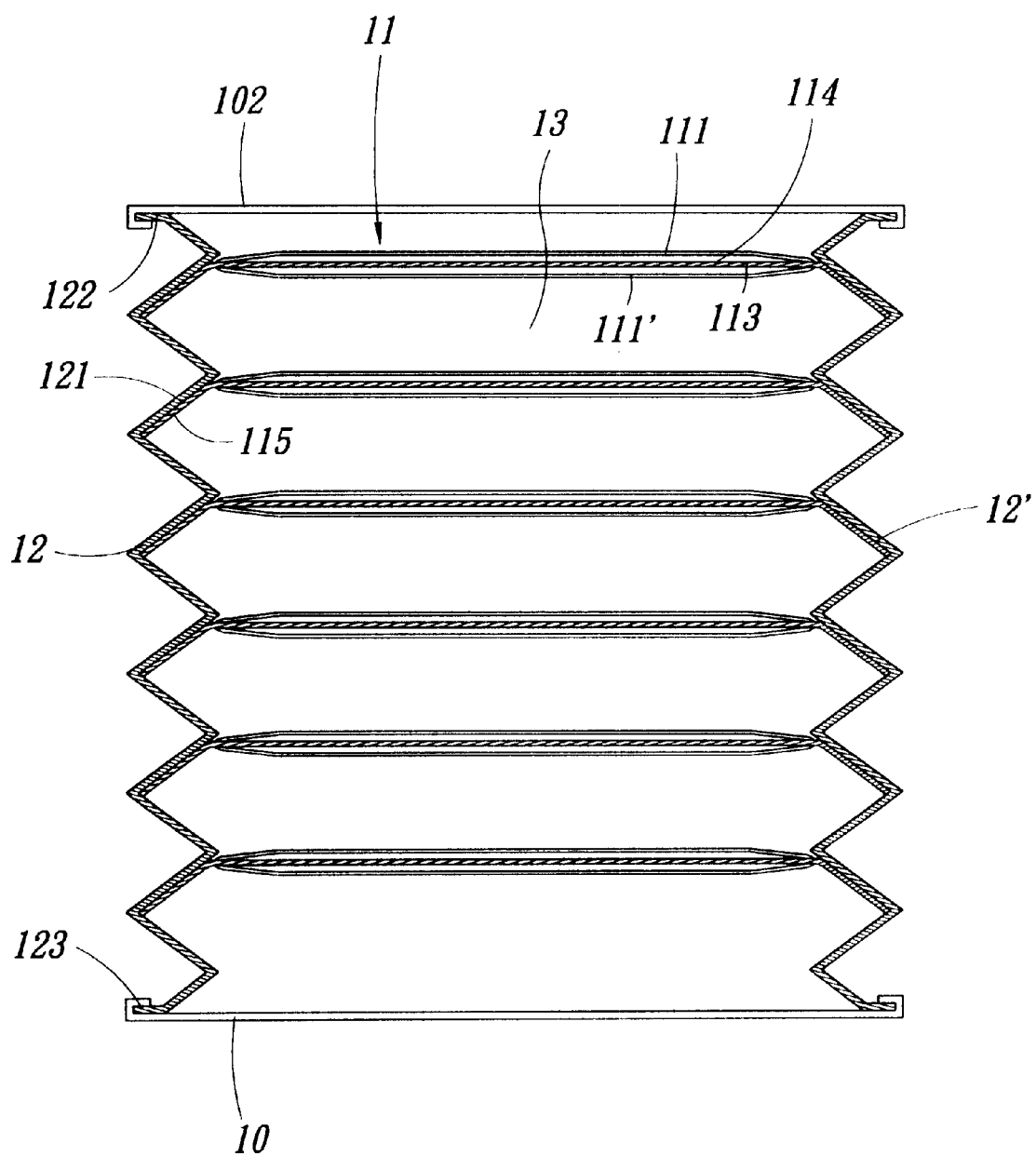
FIG. 4 is an isometric drawing of the bird's-eye view of the cross section of the invention herein.

Referring to FIG. 4, the two ends of the required pair of corresponding accordion folding sheets (12, 12') are secured respectively to the shell body (10) and the front plane (102) of the shell body to enable the protective pockets (11) to be opened as a fan, whereat the two sides of the partition (113) fixed respectively to the pocket body (111, 111') to form the containing slot; furthermore, the fixing ears (115) on both sides are secured to the internal folding surface (121) of the accordion folding sheet (12) as an integral structure; every protective pocket (11) is placed in a certain parting interval distance for the protective pocket (11) to be opened with partition to form interval slot (13) allowing the user to read the contents of the laser disc (2).

Figure 5:
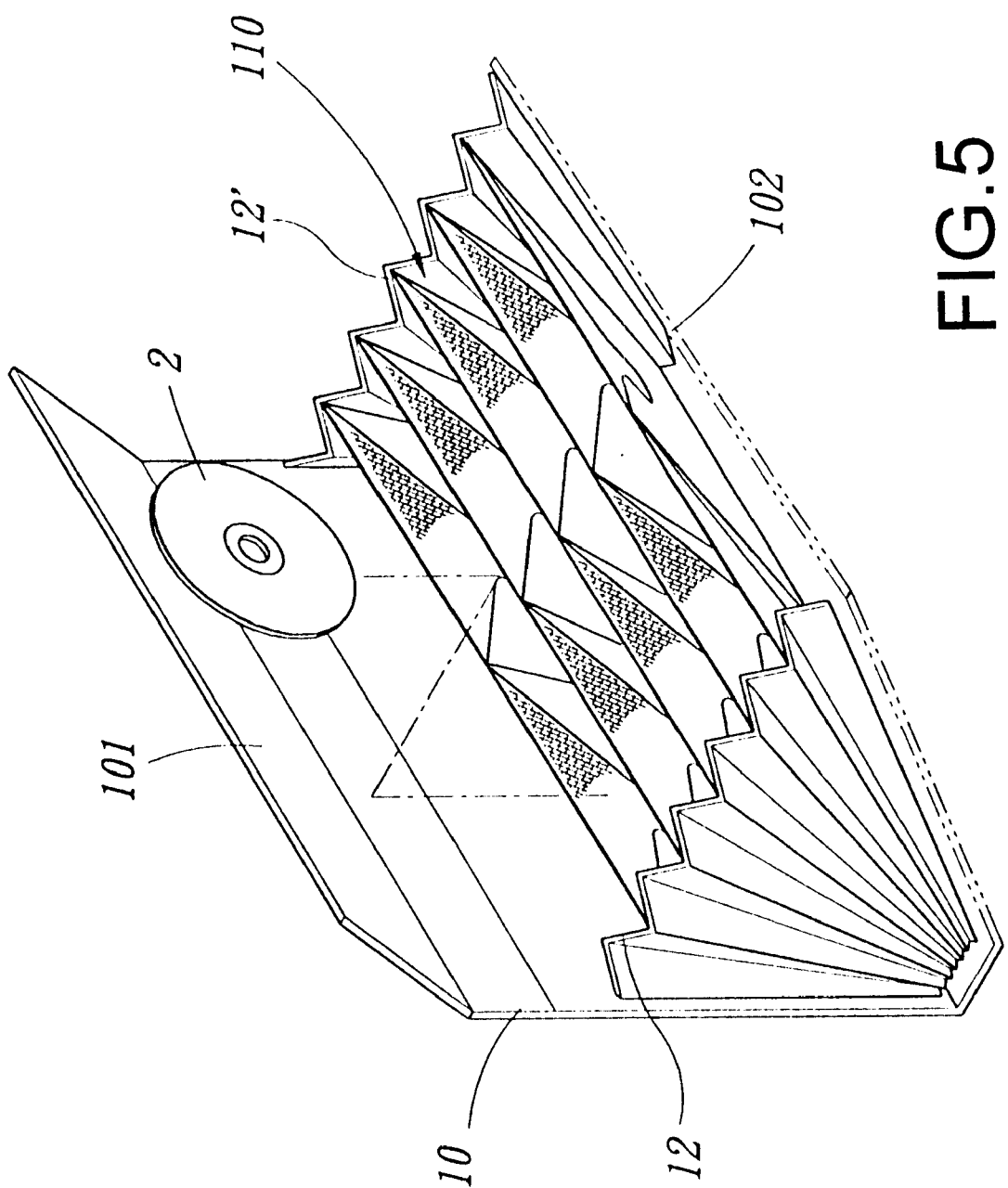
FIG. 5 is an isometric drawing of the laser disc folder in the loose-leaf style with two pocket invention herein in preferred embodiment.
Figure 6:
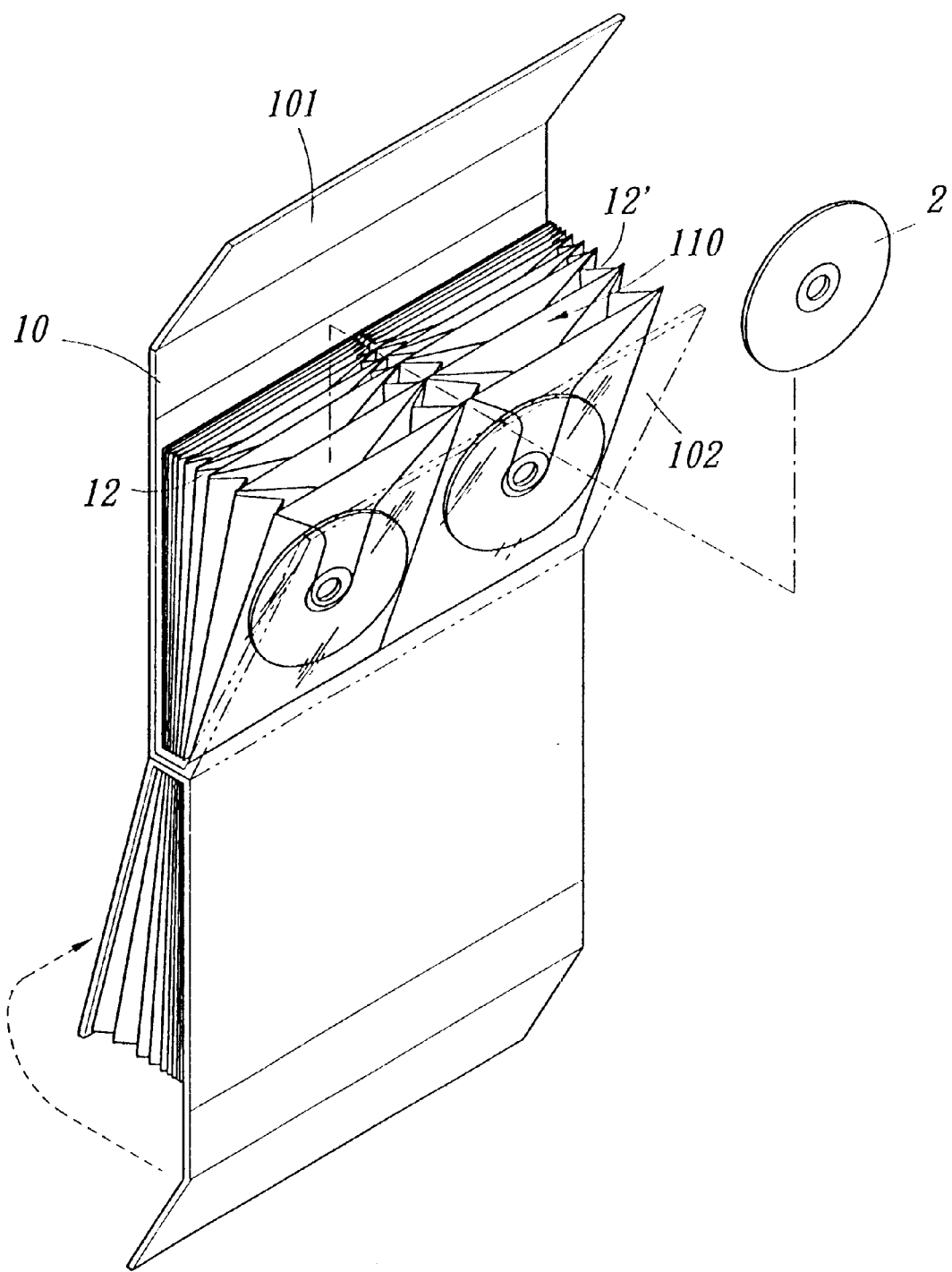
FIG. 6 is an isometric drawing of the laser disc folder in the loose-leaf style with four pockets of the invention herein in preferred embodiment.

Referring to FIGS. 5 & 6, the isometric drawings of the invention herein in embodiment in the style of two pockets and four pockets, wherein the folding sheets (12, 12') of the accordion protective folder can be embodied in two slots on one side as the double-slot protective pockets (110) with the similar spirit of the single-slot protective pocket (11), but with longer length of the protective pocket (11) and the larger size of the cover (101) of the shell body (10) and the front plane (102); the structure of the four-slot style is formed by using the opposing surfaces of two sets of double-slot protective pockets (110) as the partition and the user only has to turn to the other side in order to access to the laser disc.

In summation of the foregoing section, the innovative integral structure of the laser disc protective folder of the invention herein is simple and practical in use, and has achieved the objective of enhancing the convenient effect. Although this invention has been described in connection with specific forms and embodiments thereof, it will be appreciated that various modifications other than those discussed above may be restored to without departing from the spirit or scope of the invention. The invention herein fully complies with all new patent application requirements and is here by submitted to the patent bureau for review and the granting of the commensurate patent rights.

What is claimed is:

1. An accordion disc protective folder comprising an external shell body, a plurality of protective pockets, and two accordion folding sheets, including as follows:

said shell body configured for opening;

plural partitions made of flannel fabric, each partition having a pocket forming body secured on each side thereof, the pocket forming bodies and partitions together forming said protective pockets, each protective pocket having fixing ears on opposite ends thereof, said protective pockets being adapted to receive laser discs therein;

each said accordion folding sheet being folded in fanned shape so as to have intervals located between its folds, each accordion folding sheet having front and rear fixing ends secured to portions of said shell body;

said fixing ears of said protective pockets being secured to said accordion folding sheets so as to provide a slot-like spacing between said protective pockets along the accordion folding sheets;

wherein when the shell body is opened, all of the pockets are adapted to be displayed, thereby providing convenient access to the laser discs.

2. The protective folder as set forth in claim 1, wherein the accordion folding sheet is made of plastic.

3. The protective folder as set forth in claim 1, wherein the pocket forming bodies are sheets provided on the sides of each partition in a manner so as to form a pair of pocket forming compartments on each side of each partition.

* * * * *